United States Patent [19]

Reiner et al.

[11] 4,309,453

[45] Jan. 5, 1982

[54] PROCESS AND COMPOUNDS FOR SURFACE MODIFICATION OF MACROMOLECULAR SUBSTANCES

[75] Inventors: Roland Reiner, Eschborn; Hildulf Kaiser, Oberursel, both of Fed. Rep. of Germany

[73] Assignee: Battelle-Institut e.V., Frankfurt am Main, Fed. Rep. of Germany

[21] Appl. No.: 116,308

[22] Filed: Jan. 28, 1980

[30] Foreign Application Priority Data

Jan. 26, 1979 [DE] Fed. Rep. of Germany ....... 2902959

[51] Int. Cl.³ .............................................. B05D 3/06
[52] U.S. Cl. .............................. 427/54.1; 204/159.23; 260/349
[58] Field of Search .................. 427/54.1; 204/159.23; 260/349; 430/194

[56] References Cited

U.S. PATENT DOCUMENTS

| | | | |
|---|---|---|---|
| 3,047,553 | 7/1962 | Coffman et al. | 204/159.23 |
| 3,763,129 | 10/1973 | Sheppard et al. | 204/159.23 |
| 3,852,097 | 12/1974 | Owen | 427/54.1 |
| 3,888,833 | 6/1975 | Lednicer et al. | 427/54.1 |
| 3,892,885 | 7/1975 | Bragole | 427/54.1 |
| 3,900,683 | 8/1975 | Haynes | 260/349 |
| 3,917,656 | 11/1975 | Buckley et al. | 260/349 |

*Primary Examiner*—John H. Newsome
*Attorney, Agent, or Firm*—Fisher, Christen & Sabol

[57] ABSTRACT

For surface modification of natural or synthetic macromolecular substrates, organic compounds are used that have hydrophilic, hydrophobic, oleophobic, ionic and/or cross-linkable groups and that also have groups which are easily convertible to nitrene or carbene, e.g., azide or diazo groups. Such organic compounds are applied to the surface to be modified as a monolayer or oligolayer from a solution thereof and then are photochemically activated. Conditions which cause orientation of the molecule with the azide or diazo group toward the surface of the substrate are advantageous. The other cross-linkable groups may promote diagonal cross-linking of the applied layer.

11 Claims, No Drawings

PROCESS AND COMPOUNDS FOR SURFACE MODIFICATION OF MACROMOLECULAR SUBSTANCES

BACKGROUND OF THIS INVENTION

1. Field of this Invention

This invention relates to a process for covalent surface modification of macromolecular substances, in particular for hydrophilizing the surfaces of natural or synthetic macromolecular substrates and for giving them ionic properties. In the case of plastics, for example, this should improve their printability and their suitability for being painted and glued. This invention further relates to new azide and diazo compounds which permit surface modification and to a process for the fabrication of such compounds.

2. Prior Art

It is already known that the properties of polymer surfaces may be modified by grafting hydrophilic, hydrophobic or ionic monomers to the base polymers or by the subsequent application of soluble polymers, e.g. polyacrylic acid, to the polymer surfaces, thus causing cross-linking. Major changes in surface properties may also be achieved by chemical reactions at the polymer surface, e.g. by chlorosulfonation, oxidation, etc. Furthermore low-molecular compounds may be bonded to the surface by the effect of plasma or radiation-induced polymerization.

The disadvantage of these processes is, however, that they are specific to a particular base material and may only be applied to other materials in modified form. This makes it difficult to apply these methods to moldings consisting of several base polymers. In addition, unsatisfactory results are obtained, in particular with hydrophobic polyolefines such as polyethylene and polypropylene, process costs are high, reaction times long and subsequent treatment is necessary. A further drawback is that in many cases the base material became partially chemically decomposed with the result that fragments could easily be removed from the molding. For this reason most of these processes are used on an industrial scale only for the treatment of films.

BROAD DESCRIPTION OF THIS INVENTION

The present invention aims to overcome the drawbacks listed above and to develop an effective process for the modification of surface properties that is suitable for treating both films and other forms. More specifically, new reactive compounds are to be created that have good adhesion to the polymerizate and permit surface modification—hydrophilizing, making water or oil repellent and the creating of ionic properties—by means of simple and economic measures.

It has been found that this can be achieved in a technically advanced way if an organic monomeric or polymeric compound with at least one azide or diazo group and at least one hydrophilic hydrophobic, oleophobic, ionic and/or cross-linkable group is applied from the solution to the surface to be modified and then photochemically activated to convert the azide or diazo group into nitrene or carbene respectively by brief irradiation.

The resulting highly active materials (nitrene, carbene) stabilize themselves by insertion and addition reactions with almost all surfaces made from macromolecular substances.

Monomeric or polymeric compounds having a molecular weight of up to 50,000 g/mol may be used for modification. Apart from the named functional groups, these compounds may include cross-linkable groups such as

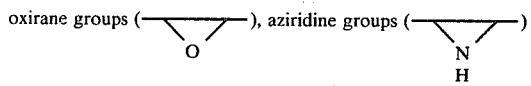

or vinyl ether groups ($CH_2=CH-O-$). The azide or diazo group may also be on a side chain of the molecule which has affinity for the surface. The polymeric compounds should preferably have one mol of azide or diazo group per 150 to 1000 g and one mol of hydrophilic, hydrophobic, oleophobic, ionic and/or cross-linkable group per 150 to 5000 g. These compounds are applied to the surface to be modified from the solution in a manner already known, for example by spraying or knife coating, in the form of an oligolayer. Aqueous, aqueous/organic or organic solvents are used for this purpose. Particularly suitable are solvents which have a good wetting effect on the surface to be modified, e.g. linear alkanes, petroleum ether in the case of polyolefines and aliphatic alcohols in the case of aromatic polyesters. When suitable catalysts are used, the cross-linkable groups further stabilize the layer.

The organic compound to be applied should preferably have the nature of a wetting agent. This is the case, for example, with compounds which have a hydrophobic, linear chain with 8 to 26, preferably 10 to 16, C atoms, the azide or diazo group being present at one end of the molecule and a hydrophilic group being present at the opposite end. Such compounds are suitable for hydrophilizing hydrophobic plastic surfaces and are preferably applied in the form of a monolayer by spreading from the solution.

The general formula for the preferred new compounds for hydrophilizing hydrophobic surfaces is:

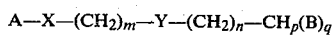

wherein
A is an $N_3$ or an $N_2CH$ group,
X is a $CH_2$, phenyl or CO group,
m is a whole number from 0 to 6,
Y is a sulfur atom or a $CH_2$ group,
p is 1 or 2,
q is 1 or 2,
n is a whole number from 7 to 25, and
B is COOH, $COOR_1$, $CH_2OR_1$, $CH_2OH$, $CONH_2$, $CONHR_2$ or $SO_2OH$ groups, wherein
$R_1$ is a hydroxyalkyl or hydroxyalkoxyalkyl groups with 1 to 6 C atoms or one monovalent cation, e.g. Na, K, and
$R_2$ is a alkyl, hydroxyalkyl or hydroxyalkoxyalkyl groups with 1 to 6 C atoms.

Particularly suitable are compounds with the formula:

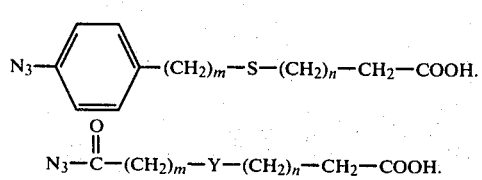

wherein the meanings of n, m and Y are as above.

These compounds may be produced according to known methods. The thioethers according to this invention, i.e. compounds in which Y stands for a sulfur atom, may be synthesized by reacting a compound having the formula:

A'—X—(CH$_2$)$_m$—SH in which X and m have the meanings given above and A' is a group, e.g. an NH$_2$ group, that is easily transformable to an azide or diazo group, with a compound having the formula:
Hal—(CH$_2$)$_n$—CH$_p$(B)$_q$ in which Hal means Cl, F or Br, n is a whole number from 8 to 26, and B has the meaning given above. A compound with the formula:

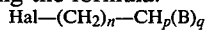
A'—X—(CH$_2$)$_m$—S—(CH$_2$)$_n$—CH$_p$(B)$_q$ is then obtained and finally the A' group is converted into an azide or diazo group in the known way.

Similarly, compounds with the formula:

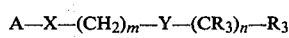
A—X—(CH$_2$)$_m$—Y—(CR$_3$)$_n$—R$_3$ may be produced, in which A, X, Y, R$_3$ and m have the meanings given above, n is a whole number from 8 to 26, and R$_3$ is a H or F atom and where at least one H atom of the (CH$_2$)$_m$ group or one R$_3$ of the (CR$_3$)$_n$ group is replaced by an oxirane, aziridine or vinyl ether group.

These groups may be applied, for example, to plastic surfaces in the form of monolayers or oligolayers from an aqueous or aqueous/organic solution. The quantity of surface-active substance required per m$^2$ is usually about 10$^{-4}$ to 10$^{-2}$ g.

The use of surface-active substances with an ω-positioned azide or diazo group is the best guarantee of a covalent bond between the basic polymerizate and the surface-active substance. Even a thin layer of the surface substance ensures strong adhesion to the basic polymer; there is some cross-linking with the latter and some cross-linking among the substance molecules themselves.

DETAILED DESCRIPTION OF THIS INVENTION

The following examples explain the invention.

EXAMPLE 1

10 parts of 4-acetamidothiophenol are reacted with 10 parts of ω-halogen undecanoic acid under the addition of 25 parts of base in an aqueous/organic solution. After removing the protective group using 0.1 n KOH at boiling heat for four hours, 10 parts of the substituted aniline are diazotized with 10 parts of sodium nitrite. 15 parts sodium azide are added to the diazonium salt solution from which the product is precipitated with a yield of 60 percent in the form of a colorless solid after 10 to 15 hours stirring (mp: 73°–75° C.).

EXAMPLE 2

10 parts of 2-(4-nitrophenyl-)1-chloroethane are reacted with thiourea in aqueous ethanol. The resulting salt is hydrolized with 20 parts of base to mercaptide. The mercaptan is separated by means of acidification, extracted and distilled. Reaction with 10 parts of ω-haloacid produces the extended paranitrophenyl-substituted carboxylic acid according to the process described in Example 1. Reduction of the nitro-group is performed in aqueous acetic acid with zinc and hydrochloric acid. Diazotization and the production of the azide are performed according to the process described in Example 1.

EXAMPLE 3

10 parts of 4-acetamidothiophenol are reacted with 10 parts ω-halogen alkyl alcohol under the addition of 15 parts of base in aqueous/organic solution. Separation of the protective group, diazotization and production of the azide are performed according to the process described in Example 1.

EXAMPLE 4

The process described in Example 1 is repeated, this time using ω-halogen dodecanoic acid instead of ω-halogen undecanoic acid. The yield is 46 percent (mp: 85°–86° C.).

EXAMPLE 5

The process described in Example 1 is repeated, this time using 1-chloroperfluorodecane instead of ω-halogen undecanoic acid. The azide yield is 38 percent.

EXAMPLE 6

The azidophenylthioether carboxylic acids are dissolved in a low-boiling polar solvent and sprayed onto the polymer surfaces forming a thin layer. This treated surface is exposed to an atmosphere saturated with steam, dried in a vacuum, and then irradiated for 15 minutes using UV lamp.

EXAMPLE 7

The azidophenylthioetheralkyl carboxylic acid is taken from a dilute chloroform solution and spread on salt-containing water in a Langmuir trough. Orientation of the surface-active substances is achieved by gradually increasing the pressure. The polymer film is dipped into and out of this monomolecular layer of the applied substance. The surface-active substances are present on the polymer surface in the form of monomolecular layer. The azide group is activated to nitrene by 15 minutes irradiation with an UV lamp; the nitrene then reacts chemically with the surface.

EXAMPLE 8

The polymer substrate is carefully laid on the oriented, monomolecular layer produced according to Example 7 and irradiated from above with an UV lamp. Chemical activation and the reaction with the surface occur during irradiation.

SUMMARY

For surface modification of natural or synthetic macromolecular substrates, organic compounds are used that have hydrophilic, hydrophobic, oleophobic, ionic and/or cross-linkable groups on the one hand and groups that are easily convertible to nitrene or carbene on the other, e.g. azide or diazo groups. These compounds are applied to the surface to be modified as a monolayer or oligolayer from the solution and then photo-chemically activated. Conditions which cause orientation of the molecule with the azide or diazo group toward the surface of the substrate are advantageous. The other cross-linkable groups may promote diagonal cross-linking of the layer applied.

We claim:

1. Process for covalent surface modification of a macromolecular substance comprising applying a solution of an organic monomeric compound having a hydrophobic linear chain having 1 to 26 carbon atoms, having at least one azide or diazo group at one end of said monomeric compound, and having at least one hydrophilic, hydrophobic, oleophobic and/or ionic group present at the opposite end of said monomeric compound, to the surface of said macromolecular substance and then photochemically activating said organic monomeric compound to convert said at least one azide or diazo group of said organic monomeric compound into at least one nitrene or carbene group, respectively.

2. Process as claimed in claim 1 wherein said hydrophobic linear chain of said organic monomeric compound has 10 to 16 carbon atoms.

3. Process as claimed in claim 1 wherein said monomeric compound has the formula:

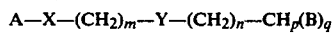

wherein
A is an $N_3$ group or an $N_2CH$ group,
X is $CH_2$, phenyl or CO,
m is a whole number from 0 to 6,
Y is a sulfur atom or $CH_2$,
n is a whole number 7 to 25,
p is 1 or 2
q is 1 or 2, and
B is COOH, $COOR_1$, $CH_2OR_1$, $CH_2OH$, $CONH_2$, $CONHR_2$ or $SO_2OH$,
wherein $R_1$ is hydroxyalkyl or hydroxyalkoxyalkyl, each alkyl having 1 to 6 carbon atoms, or is one monovalent cation, and $R_2$ is alkyl, hydroxyalkyl or hydroxyalkoxyalkyl, each alkyl having 1 to 6 carbon atoms.

4. Process as claimed in claim 3 wherein $R_1$ in $COOR_1$ or $CH_2OR_1$, of B, is a monovalent cation which is Na or K.

5. Process as claimed in claim 3 wherein said organic monomeric compound has the formula:

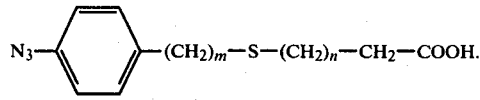

wherein m and n have the same meanings as in claim 3.

6. Process as claimed in claim 3 wherein said organic monomeric compound has the formula:

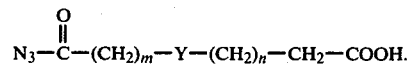

wherein n, m and Y have the same meanings as in claim 3.

7. Process as claimed in claim 1 wherein said organic monomeric compound has a molecular weight up to 50,000 g/mol, there being one mol of azide or diazo group per 150 to 1000 g of said organic monomeric compound and one mol of hydrophilic, hydrophobic, oleophobic, ionic and/or cross-linkable group per 150 to 5000 g of said organic monomeric compound.

8. Process as claimed in claim 7 wherein said organic monomeric compound has the formula:

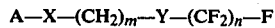

wherein A is an $N_3$ group or an $N_2CH$ group, X is $CH_2$, phenyl or CO, Y is a sulfur atom or $CH_2$, m is a whole number from 0 to 6, and n is a whole number from 8 to 26, and wherein at least one H atoms of the $(CH_2)_m$ group or one F atom of the $(CF_2)_n$ group is replaced by said cross-linkable group.

9. Process as claimed in claim 8 wherein said cross-linkable group is an oxirane, aziridine or vinyl ether group.

10. Process as claimed in claim 7 wherein said cross-linkable group is an oxirane, aziridine or vinyl ether group.

11. Process as claimed in claim 10 wherein said organic monomeric compound has the formula:

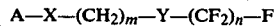

wherein A is an $N_3$ group or an $NH_2CH$ group, X is $CH_2$, phenyl or CO, Y is a sulfur atom or $CH_2$, m is a whole number from 0 to 6, and wherein n is whole number from 8 to 26, and at least one H atom of the $(CH_2)_m$ group or one F atom of the $(CF_2)_n$ group is replaced by said cross-linkable group.

* * * * *